US011507786B2

(12) United States Patent
Arnett

(10) Patent No.: US 11,507,786 B2
(45) Date of Patent: Nov. 22, 2022

(54) DYNAMIC GENERATION OF CLIENT-SPECIFIC FEATURE MAPS

(71) Applicant: FinancialForce.com, Inc., San Francisco, CA (US)

(72) Inventor: Jonathan Spencer Arnett, Leeds (GB)

(73) Assignee: FinancialForce.com, Inc., San Francisco, CA (US)

( * ) Notice: Subject to any disclaimer, the term of this patent is extended or adjusted under 35 U.S.C. 154(b) by 525 days.

(21) Appl. No.: 16/673,756

(22) Filed: Nov. 4, 2019

(65) Prior Publication Data

US 2021/0133514 A1 May 6, 2021

(51) Int. Cl.
*G06K 9/62* (2022.01)
*G06V 10/75* (2022.01)

(52) U.S. Cl.
CPC ......... *G06K 9/6272* (2013.01); *G06K 9/6232* (2013.01); *G06V 10/751* (2022.01)

(58) Field of Classification Search
None
See application file for complete search history.

(56) References Cited

U.S. PATENT DOCUMENTS

| | | | | |
|---|---|---|---|---|
| 5,796,952 A | * | 8/1998 | Davis | H04L 67/306 709/224 |
| 11,294,771 B1 | * | 4/2022 | Chopra | G06F 16/128 |
| 2004/0027258 A1 | * | 2/2004 | Pechatnikov | G01C 21/3682 340/995.12 |
| 2005/0033511 A1 | * | 2/2005 | Pechatnikov | G01C 21/3611 701/411 |
| 2007/0044072 A1 | * | 2/2007 | Hayles | G06F 8/35 717/109 |
| 2009/0271514 A1 | * | 10/2009 | Thomas | G06F 11/3438 709/224 |
| 2013/0104078 A1 | * | 4/2013 | Miyazaki | H04N 1/00424 715/833 |
| 2014/0040058 A1 | * | 2/2014 | Aklian | G06Q 10/101 705/26.1 |
| 2016/0371080 A1 | * | 12/2016 | Rath | G06F 8/71 |
| 2019/0258756 A1 | * | 8/2019 | Minwalla | G06F 30/20 |

* cited by examiner

*Primary Examiner* — Delomia L Gilliard
(74) *Attorney, Agent, or Firm* — Kokka & Backus, PC

(57) ABSTRACT

The present disclosure relates to methods and systems to generate a modified feature map specific to a client. A template feature map may be modified based on usage data associated with a client. The template feature map may represent a visual representation of a plurality of features provided by an operator, each feature associated with a plurality of instructions to be processed for the client. The usage data may be compared with each feature to determine whether any feature is associated and/or utilized by the client. Based on determining whether the usage data indicates that any feature is associated and/or utilized by the client, the template feature map may be modified to perform an action to the template feature map indicating that a feature is associated and/or utilized by the client. A modified template feature map may be generated that is specific for a client.

16 Claims, 9 Drawing Sheets

| TOPIC 302 | APPLICATION 304 | USAGE INFORMATION 306 |
|---|---|---|
| ACCOUNTS RECEIVABLE 302a | SALES INVOICES 304a | X |
| ACCOUNTS RECEIVABLE 302a | NOTIFICATION CORRESPONDENCE 304b | X |
| ACCOUNTS RECEIVABLE 302a | THIRD PARTY APPLICATION 306a | |
| ACCOUNTS RECEIVABLE 302a | COLLECTIONS 304c | |
| ACCOUNTS PAYABLE 302b | CASH ENTRIES 304d | X |
| ACCOUNTS PAYABLE 302b | PAYMENT APPLICATION 304e | |
| ACCOUNTS PAYABLE 302b | PAYABLE CREDIT NOTES 304f | X |
| ACCOUNTS PAYABLE 302b | PAYABLE INVOICES 304g | X |
| ACCOUNTS PAYABLE 302b | THIRD PARTY APPLICATION 306b | X |
| ACCOUNTS PAYABLE 302b | THIRD PARTY APPLICATION 306c | |
| ACCOUNTS PAYABLE 302b | THIRD PARTY APPLICATION 306d | X |
| VAT REPORTING 302c | VAT REPORTING APPLICATION 304h | X |
| TOPIC N 302n | APPLICATION N 304n | X |
| TOPIC N 302n | THIRD PARTY APPLICATION N 306n | |

FIGURE 3

DYNAMIC GENERATION OF CLIENT-SPECIFIC FEATURE MAPS

TECHNICAL FIELD

This disclosure relates to feature map generation, and, in particular, to generating client-specific feature maps based on feature usage data of each client.

BACKGROUND

Entities (e.g., a corporation, a vendor) may provide solutions to clients that include one or more features. As an example, a corporation may provide financial accounting solutions to clients that include multiple additional features relating to financial accounting that a client can utilize. In many cases, these entities may have a plurality of features available to clients. Accordingly, entities may generate a visual representation of all available solutions/features to provide clients an easily-understandable representation of the available solutions/features.

In some cases, entities may provide visual representations to a prospective client to illustrate all available solutions and/or features that can be provided to the prospective client. In other cases, entities may provide these visual representations to current clients to illustrate solutions/features that are already provided or can be provided to the client.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

FIG. 3 is a block diagram illustrating example usage data associated with a client, in accordance with various embodiments.

Figure 1:
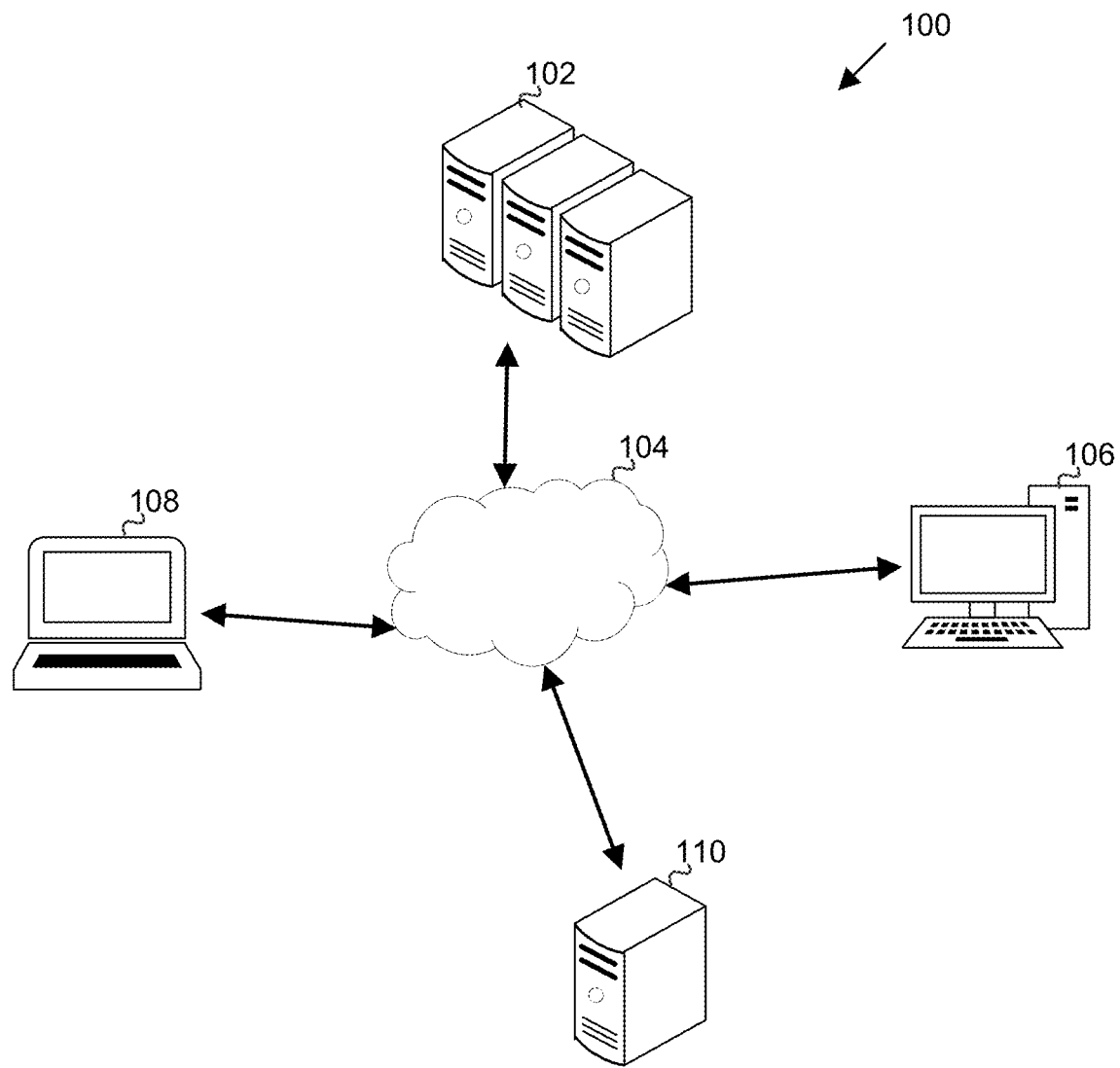
FIG. 1 illustrates a block diagram of a network architecture, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to generate a client-specific modified feature map.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Overview

Various entities (e.g., vendors, corporations, operators) may provide solutions for clients. For example, a corporation may perform financial accounting tasks for one or more clients. The entity can instruct a computing device (e.g., a server, network-accessible server system) to execute instructions relating to applications associated with the clients. For example, a corporation can maintain a server configured to execute applications for a client and generate resultant data resulting from executing the applications. The resulting data may include information generated by processing application instructions that can be sent to the client.

In many cases, entities may utilize feature maps to provide a visual representation of all available features/applications provided by the entity. For example, a corporation may provide a feature map to a prospective client to illustrate all available solutions and/or features that can be provided to the prospective client. As another example, entities may provide a feature map to a current client to illustrate solutions/features that are currently provided to the client or can be provided to the client.

However, in many cases, a feature map that includes a visual representation of all available features/applications offered by the entity may include a large number of features/applications. This large number of features/applications may lower user experience to prospective/current clients, as clients may have difficulty understanding features/application provided to the client. For example, if a feature map includes a large number of available features, the client may be unable to ascertain which features are already provided to the client and which other features could be offered to the client.

Further, a feature map that is universal for all features/applications provided by an entity may include applications that are not applicable or not available to a client. This may lower user experience, as clients may be unable to discern applications that are available/utilized by the client.

Additionally, in many cases, entities may manually generate visual representations of available solutions/features that is specific to each client. This may be performed manually by an operator, which may include the operator manually inspecting various sources of data to identify all presently provided features and potential features that could be offered to the client. However, this may include the operator on a network-accessible electronic device (e.g., mobile phone, laptop) retrieving information over a network (e.g., the internet). This may result in a network-resource intensive and an inefficient use of computational resources.

System Overview

The present embodiments relate to dynamic generation of client-specific feature maps. Upon a request for a client-specific feature map, a template feature map including a visual representation of all topics/applications provided by an operator may be obtained. Usage data associated with a client can be inspected to determine what solutions/features are provided to the client and which features are utilized by the client. Based on this determination, the template feature map can be modified to indicate what topics/applications are available and/or utilized by the client. This client-specific feature map may provide a visual representation of what solutions/features are available to the client, utilized by the client, and not utilized by the client.

Dynamically generating client-specific feature maps may increase client engagement and experience by providing unique visual representations of available and utilized solutions/features to the client. A computing device (e.g., a server, network-accessible server system, computer) may utilize usage data associated with each client to generate client-specific feature maps. This process to generate client-specific feature maps may improve computational-resource efficiency by only utilizing usage data to generate the maps. In contrast to performing multiple iterations of requesting and receiving information to identify available/utilized features associated with a client, the present embodiments may dynamically generate client-specific feature maps using client usage data, which may increase both computer and network functionality.

FIG. 1 illustrates a block diagram of a network architecture 100, in accordance with various embodiments. The network architecture 100 may facilitate data transmission between devices in the network. As shown in FIG. 1, the network architecture can include a network-accessible server system 102. The network-accessible server system 102 can include one or more interconnected computing devices (e.g., servers, computers) configured to perform various processing tasks. The network-accessible server system 102 can include cloud servers configured to communicate with other devices via a network 104 (e.g., the cloud 104).

In some embodiments, the network-accessible server system 102 may be configured to execute instructions relating to various applications. For example, network-accessible server system 102 may process instructions associated with an application (e.g., accounts receivable applications, accounts payable applications) as described with reference to FIG. 2.

The network-accessible server system 102 can communicate with an operator device 106 via network 104. The operator device 106 can include a computing device (e.g., computer) associated with an operator (e.g., vendor, corporation) and configured to interact with the network-accessible server system 102. In some embodiments, the operator device 106 may provide instructions to the network-accessible server system 102 to perform processing tasks. For example, the operator device 106 may provide an instruction to execute a series of instructions associated with applications for a client of the operator.

In some embodiments, the operator device 106 may determine what applications are to be performed by the network-accessible server system 102 for a client. For example, the operator device 106 may instruct the network-accessible server system to add or remove an application to be executed by the network-accessible server system 102 for a client. The operator device 106 may obtain usage data relating to clients from the network-accessible server system 102 that represents information resulting from executing the processes associated with a client.

The network architecture 100 can include a client device 108 configured to interact with any of the network-accessible server system 102 and the operator device 106. The client device 108 may provide input data to the network-accessible server system 102 that can be used by the network-accessible server system 102 to process instructions and generate resultant data for the client.

The network architecture 100 can include a third-party computing device 110. Third-party computing device 110 can include a computing device (e.g., server) associated with a third party (e.g., a third-party vendor). Any of the operator device 106 and network-accessible server system 102 can interact with and transmit information to the third-party computing device 110. As discussed with greater detail below, the third-party computing device 110 can process instructions relating to third party applications.

Figure 2:
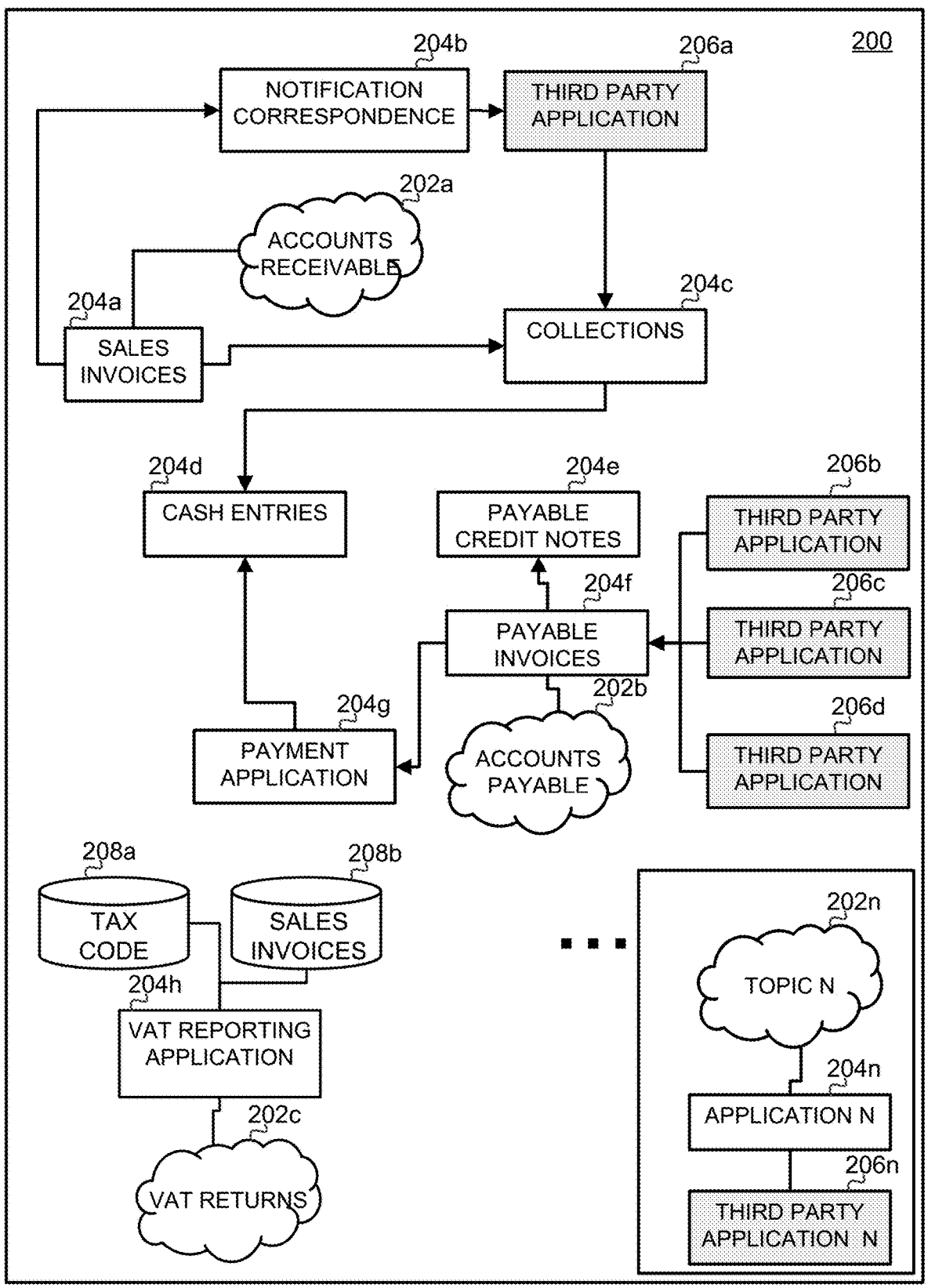
FIG. 2 illustrates a block diagram of a template feature map, in accordance with various embodiments.

FIG. 2 illustrates a block diagram of a template feature map 200, in accordance with various embodiments. As shown in FIG. 2, a template feature map 200 may include a visual representation of solutions and applications that can be provided by an operator.

The template feature map 200 may be universal for all prospective and present clients. The template feature map 200 may allow for either prospective or current clients to view all available features in a single visual representation of the features. Each operator may have a unique template feature map 200 specific to that operator.

Each feature (or "application") 204a-n may include applications that can be performed for a client. For example, a sales invoice application 204a may correspond to a series of instructions that can be executed to generate sales invoice data for the client. In operation, the operator can instruct the network-accessible server system 102 to perform a unique subset of applications 204a-n for each client. The template feature map 200 can illustrate all available applications that can be provided to a client.

The template feature map 200 may include a plurality of topics 202a-n, applications 204a-n associated with the topics 202a-n, third party applications 206a-n associated with the topics 202a-n, and storage modules 208a-b.

Topics 202a-n can include a subset of applications that can be provided to a client. As an example, topics can include an accounts payable topic 202a, an accounts receivable topic 202b, a value added tax (VAT) returns topic 202c, and any other topic (e.g., topic N 202n).

Applications 204a-n can include a series of processing instructions that can be executed for a client. For example, a sales invoice application 204a can perform a series of instructions to generate sales invoice data for a client. As another example, the accounts receivable topic 202a can include a sales invoices application 204a, a notification correspondence application 204b, a collections application 204c, and a cash entries application 204d. In this example, the accounts payable topic 202b can include a payable invoice application 204f, a payable credit note application 204e, and a payment application 204g. In this example, the VAT returns topic 202c can include a VAT reporting application 204h. Topic N 202n can include any number of suitable applications 204n.

The topics 202a-n can also include third-party applications 206a-n that represent applications processed by third party computing devices 110. As an example, the accounts receivable topic 202a can include one third party application 206a, and the accounts payable topic 202b can include multiple third-party applications 206b-d.

The topics 202a-n can be associated with various storage modules 208a-b. Storage modules 208a-b can store specific data relating to each topic that can be utilized by applications. For example, the VAT returns topic 202c can include a tax code storage module 208a configured to store tax code data and a sales invoice storage module 208b configured to store sales invoice data. In this example, the VAT reporting application 204h can utilize the data stored in the storage modules 208a-b to perform tasks relating to the application 204h.

FIG. 3 is a block diagram illustrating example usage data 300 associated with a client, in accordance with various embodiments. Usage data 300 can include information resulting from the processing of various applications for a client. For example, the client may provide input data to the network-accessible server system, and the network-accessible server system can execute instructions relating to applications, where the data resulting from executing the instructions includes the usage data.

In some embodiments, the usage data 300 can include data received by the network-accessible server system after processing instructions relating to applications for a client. The usage data can be inspected to determine usage data associated with each application. For example, the usage data can be divided into portions of usage data that are generated as a result of processing an application for a client.

In some embodiments, the usage data 300 may be structured into a database or spreadsheet. For example, usage data can be structured into a spreadsheet as shown in FIG. 3, where each row is associated with usage data for a specific application. In some embodiments, usage data for each application can be included in multiple rows of a spreadsheet or database.

As shown in FIG. 3, the usage data 300 can be divided into rows based on each application. Each row of the usage data can be associated with a topic 302a-n and an application 304a-n. For example, a first row of usage data can be associated with an accounts receivable topic 302a and a sales invoice application 304a.

Associated with each topic 302a-n and application 304a-n can include usage information 306. Usage information 306 can include one or more entries including data resulting from the processing of instructions for each application. For example, the sales invoices application 304a can include one more numerical entries associated with sales invoice data. In some embodiments, any application that includes one or more non-zero entries of usage information 306 may include an 'x' or another indicator indicating that the application includes one or more non-zero entries.

In some embodiments, the usage data can represent whether each application is utilized. An application may be determined to be utilized when the usage data for an application includes one or more non-zero entries. Additionally, an application may be determined to be available to the client when the usage data includes any entries associated with the client. In other words, applications that are not available to the client may not have any entries included in the usage data, indicative that the application is not available to the client.

In some embodiments, the usage data 300 can be inspected to determine whether an application is utilized using any of a neural net, machine learning, etc. For example, a portion of the usage data can be inspected to determine what application generated the portion of the usage data. As another example, the usage data can be tracked over a period of time to determine changes in the usage data and to determine utilized applications for a client.

Figure 4:
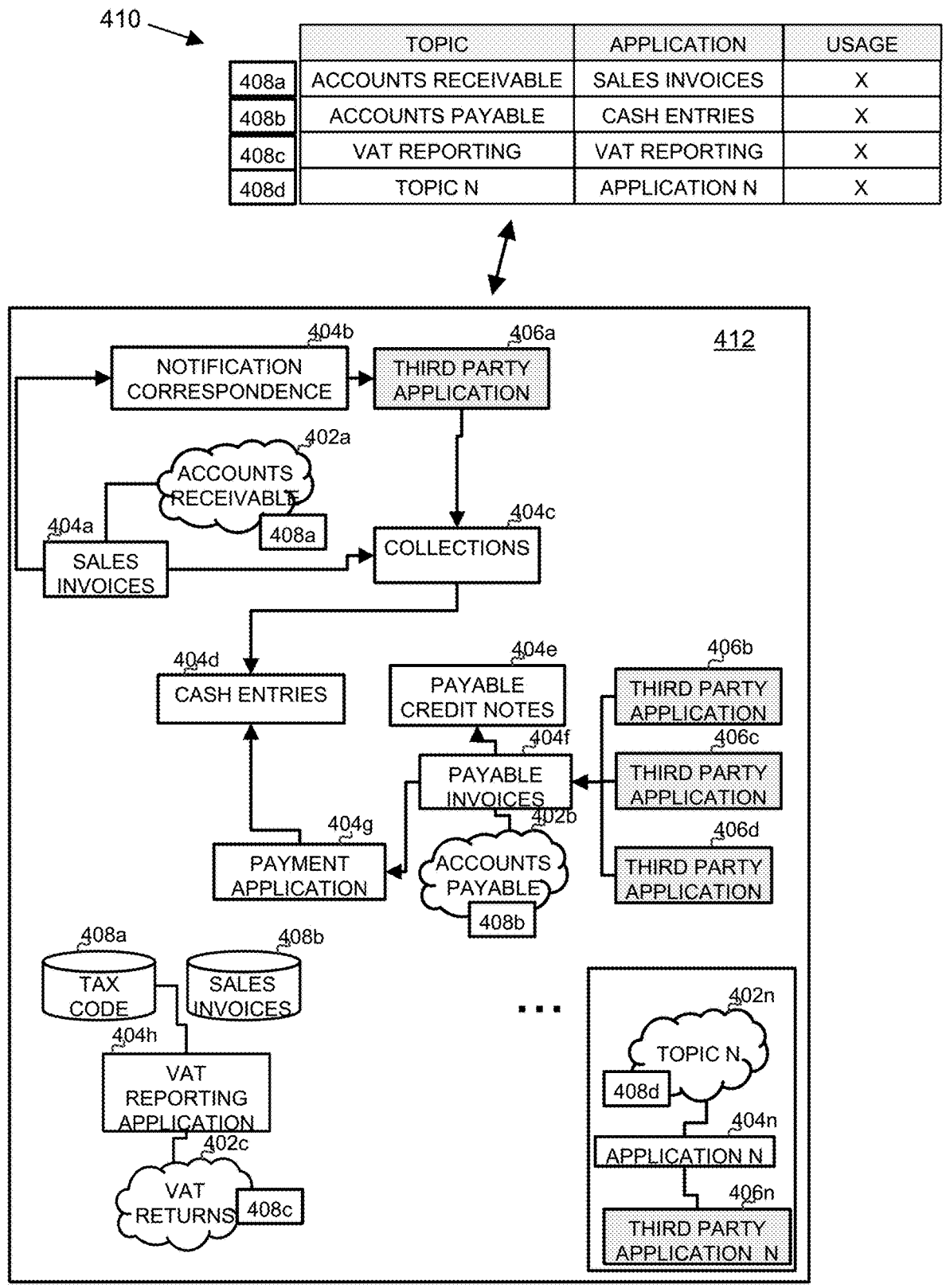
FIG. 4 illustrates a mapping between usage data and a template feature map, in accordance with various embodiments.

FIG. 4 illustrates a mapping between usage data 410 and a template feature map 412, in accordance with various embodiments. As shown in FIG. 4, usage data 410 can be associated with a template feature map 412. For example, a row of usage data 410 structured in a database or spreadsheet can correspond to a topic or application on the template feature map 412.

As noted above, each feature on the template feature map may be a visual representation of an application to be executed by a network-accessible server system. For example, a sales invoices feature 404a can represent a first set of processes relating to generating sales invoice data for a client. In some embodiments, a row of usage data can be associated with a specific topic or application. For example, as shown in FIG. 4, a first correlation 408a can be between an accounts receivable topic 402a and a first row of the usage data 410. In some embodiments, a correlation 408a-d can associate a topic/application with one or more rows of data. Accordingly, a portion on the template feature map 412 can correlate with a portion of the usage data 410.

The correlations 408a-d can facilitate interactivity between the usage data 410 and template feature map 412. For example, modifying a first application (e.g., sales invoices application 404a) can modify a corresponding portion of the usage data 410 (e.g., the sales invoices row of the usage data). Accordingly, an operator can modify the location of an application on the feature map 412, and the application can correspond to a specific row of usage data.

In some embodiments, interacting with a portion of the template feature map 412 can allow access to corresponding usage data information. For example, interacting with (e.g., selecting, clicking) a first application (e.g., sales invoices application 404a) may provide corresponding usage information that correlates to the first application.

Figure 5:
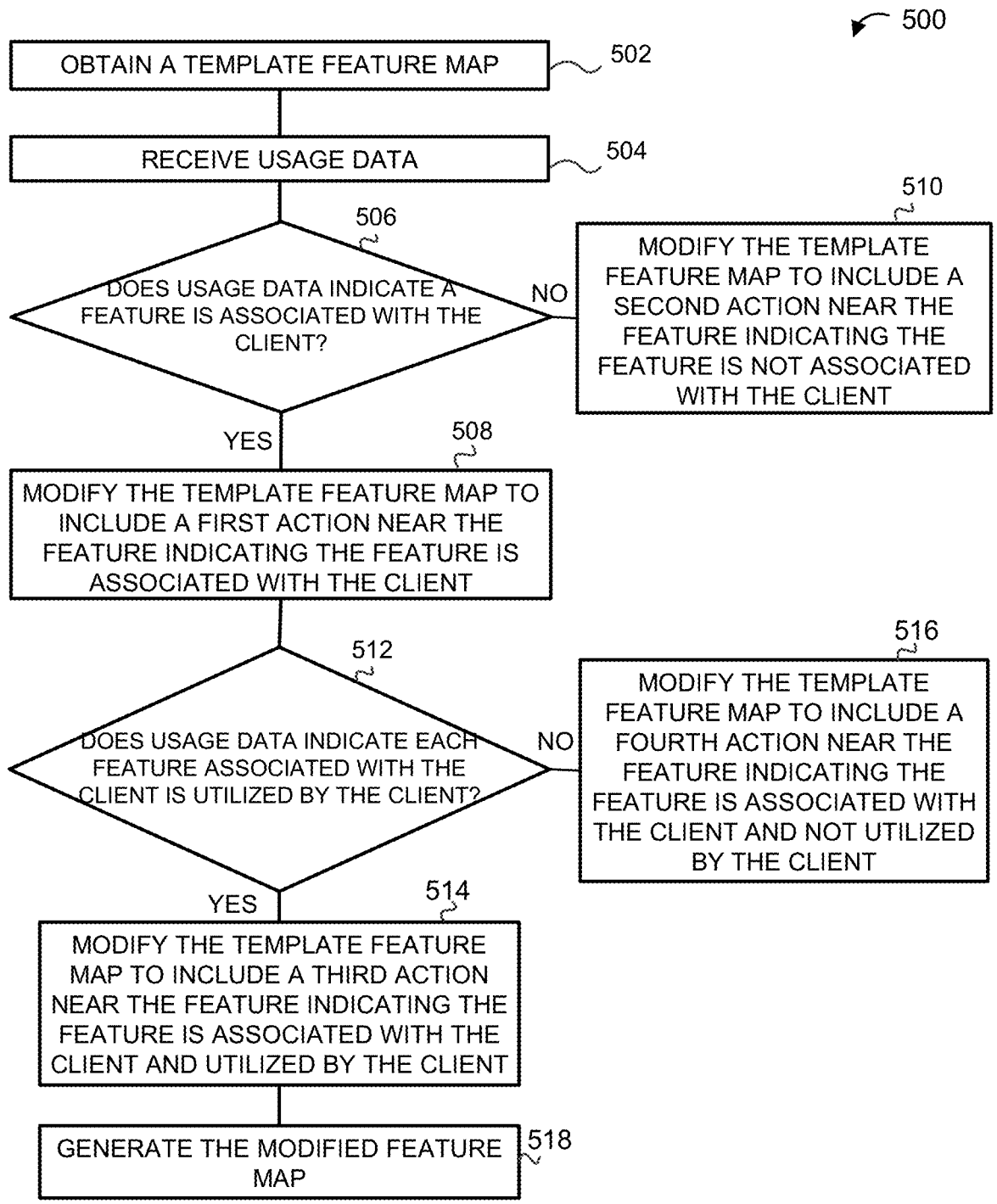
FIG. 5 illustrates a block diagram of a flow process for generating a modified feature map, in accordance with various embodiments.

FIG. 5 illustrates a block diagram of a flow process 500 for generating a modified feature map, in accordance with various embodiments. The method may include obtaining a template feature map (block 502). The template feature map can be reconceived from any of a device associated with an operator or a network-accessible server system. In some embodiments, the template feature map may be obtained based on receiving a request for a modified feature map for a client.

The method may include obtaining usage data relating to a client (block 504). The usage data may include data resulting from executing instructions relating to applications for a client. The usage data may be structured in a database or spreadsheet.

The method may include determining whether the usage data indicates that a feature is associated with a client (block 506). All features associated with the client may include features that are provided to the client. For example, features associated with the client can include applications that the client requested to be performed for the client.

This may include inspecting the usage data to determine whether there are any usage data entries associated with the feature. For example, a row of the usage data associated with a first feature can be inspected to determine whether the row includes any usage information.

If the usage data indicates that a feature is associated with the client, the template feature map can be modified to include a first action near the feature indicating that the feature is associated with the client (block 508). The first action can include adding an icon (e.g., a check mark) to the template feature map indicating that a feature is associated with the client. The first action is described in greater detail with respect to FIG. 6.

If the usage data indicates that a feature is not associated with the client, the template feature map can be modified to include a second action near the feature indicating that the feature is not associated with the client (block 510). The second action can include adding an icon (e.g., an 'X') to the template feature map indicating that a feature is not associated with the client. The second action can also include removing the feature from the template feature map. The second action is described in greater detail with respect to FIGS. 6-7.

For each feature that is associated with the client, the method may include inspecting the usage data to determine whether the feature is utilized by the client (block 512). This may include determining whether the usage data includes any non-zero entries associated with the feature.

If the usage data indicates that a feature is utilized with the client, the template feature map can be modified to include a third action near the feature indicating that the feature is associated with the client and utilized by the client (block 514). The third action can include adding an icon (e.g., a check mark) to the template feature map indicating that a feature is associated with the client and utilized by the client. The third action is described in greater detail with respect to FIGS. 6-7.

If the usage data indicates that a feature is associated with the client but not utilized by the client, the template feature map can be modified to include a fourth action near the feature indicating that the feature associated with the client but not utilized by the client (block 516). The fourth action can include adding an icon (e.g., a question mark) to the template feature map indicating that a feature associated with the client but not utilized by the client. The fourth action is described in greater detail with respect to FIGS. 6-7. This may be repeated for each feature included in the template feature map.

The method may include outputting a modified feature map (block 518). The modified feature map may include the template feature map that was modified using the method outlined above. The modified feature map may be provided to a client or to an operator device to be utilized by any of the client or operator.

Figure 6:
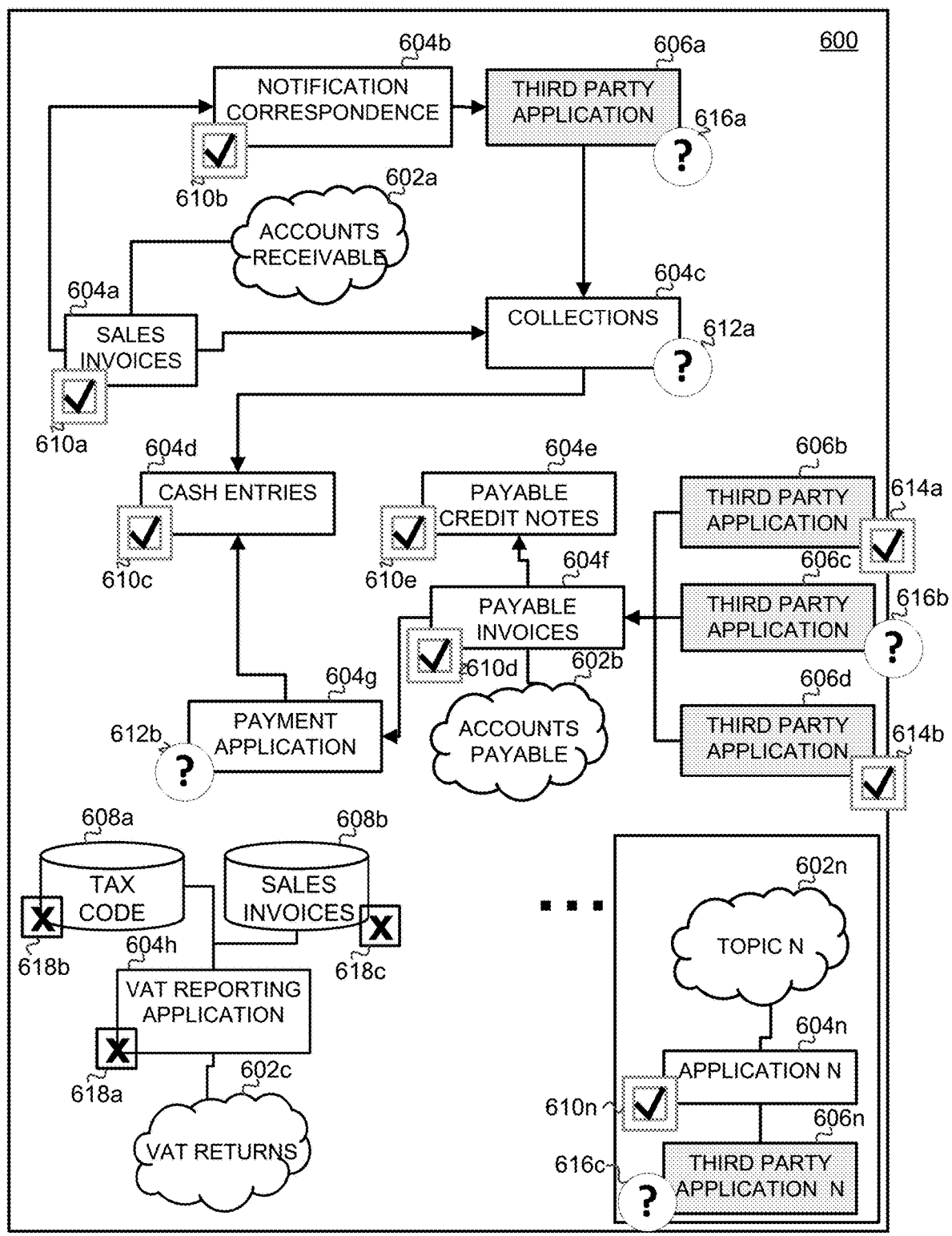
FIG. 6 illustrates a block diagram of a generated client-specific feature map, in accordance with various embodiments.

FIG. 6 illustrates a block diagram of a generated client-specific feature map 600, in accordance with various embodiments. As shown in FIG. 6, various icons 610-618 may be added to the generated client-specific feature map 600.

The generated client-specific feature map 600 may include a first icon 610a-n indicating that a feature is available and utilized by the client. For example, the sales invoices application 604a can include a first icon 610a (e.g., a checkmark) indicating that the usage data includes entries indicating that the sales invoices application 604a is available and utilized by the client. Each icon 610a-n can be added to the feature map 600 near each application 604a-n.

In some embodiments, the icon 610a-n may be selected to identify more information about the usage data. For example, a first icon 610a can be selected to view usage data associated with the sales invoices application 604a.

The generated client-specific feature map 600 may include a second icon 612a-b indicating that a feature is available to the client but not utilized by the client. The second icon 612a-b can include an indication (e.g., a question mark) indicating that the application is available to the client but not utilized by the client. For example, a collections application 604c may include a second icon 612a based on determining that the usage data includes entries for the collections application 604c, but the usage data entries indicate that the collections application 604c is not utilized by the client. The second icon 612a-b can be utilized to indicate to the client that the client has application(s) provided to them that are not sufficiently utilized by the client.

The generated client-specific feature map 600 may include a third icon 614a-b indicating that a third-party application is available and utilized by the client. As noted above, a third-party application may include an application executed by a third-party device. The third-party device may send usage data relating to the third-party application for a client to any of the operator device or the network-accessible server system. Based on the received third-party application usage data, it may be determined whether the third-party application is available to the client and utilized by the client. If the third-party application is available to the client and utilized by the client, the third icon 614a-b (e.g., checkmark) may be added to the feature map near the third-party application.

The generated client-specific feature map 600 may include a fourth icon 616a-c indicating that a third-party application is available but not utilized by the client. If the third-party application is available to the client and utilized by the client, the fourth icon 616a-c (e.g., question mark) may be added to the feature map near the third-party application.

The generated client-specific feature map 600 may include a fifth icon 618a-c indicating that a feature is not available to the client. The fifth icon may be added to the feature map 600 upon determining that the usage data does not include any entries associated with a feature. The fifth icon 618a-c (e.g., an 'X') may be added to the feature map near and feature that is not available to a client.

Figure 7:
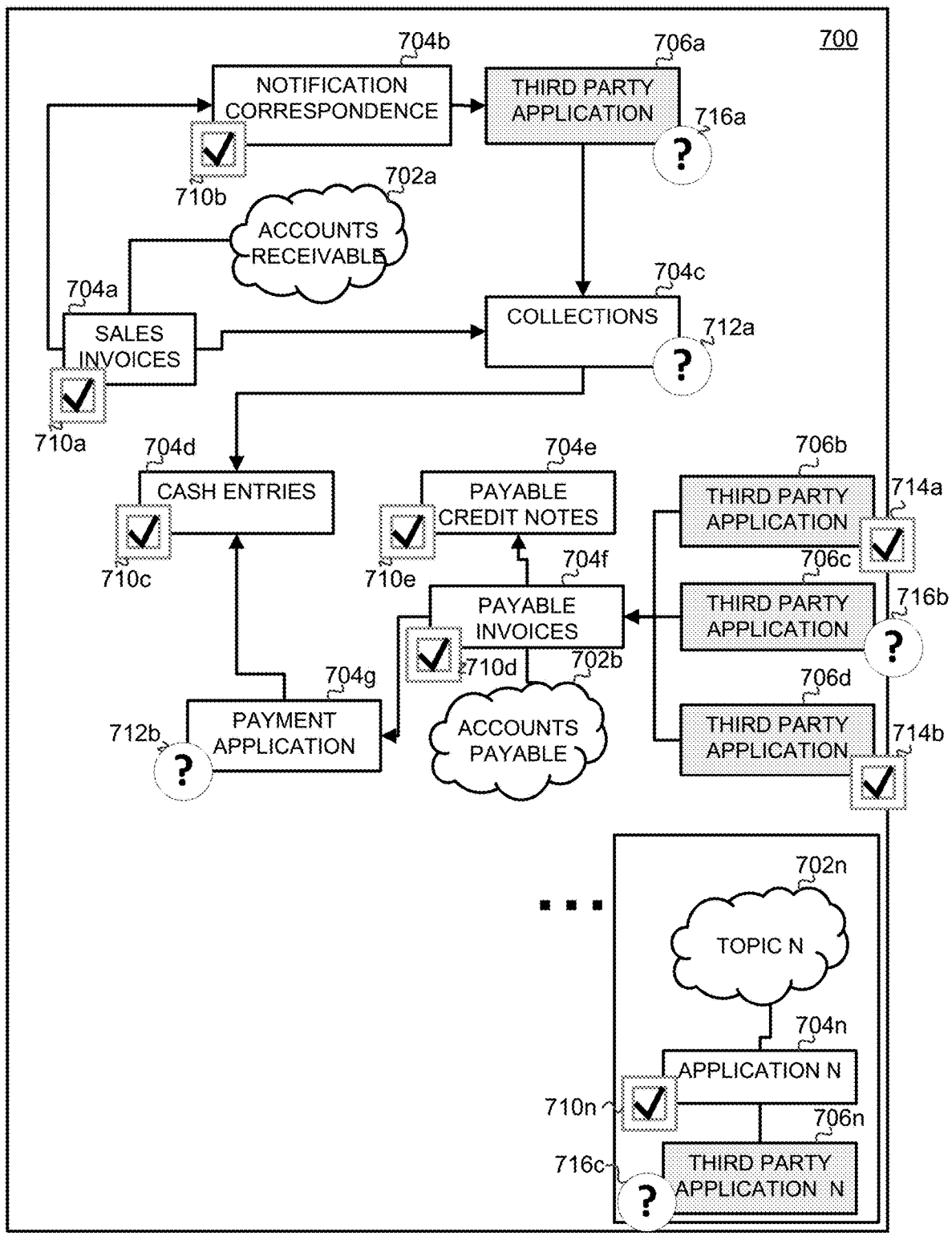
FIG. 7 illustrates a block diagram of a generated client-specific feature map, in accordance with various embodiments.

FIG. 7 illustrates a block diagram of a generated client-specific feature map 700, in accordance with various embodiments. As shown in FIG. 7, applications that are not available to a client may be removed. For example, a VAT returns 602c, a VAT reporting application 604h, and storage modules 608a-b may be removed from the generated client-specific feature map 700 upon determining that the applications/topics are not associated with the client. Removing applications that are not associated with the client from the feature map 700 may provide an easily identifiable listing of applications associated with the client.

Figure 8:
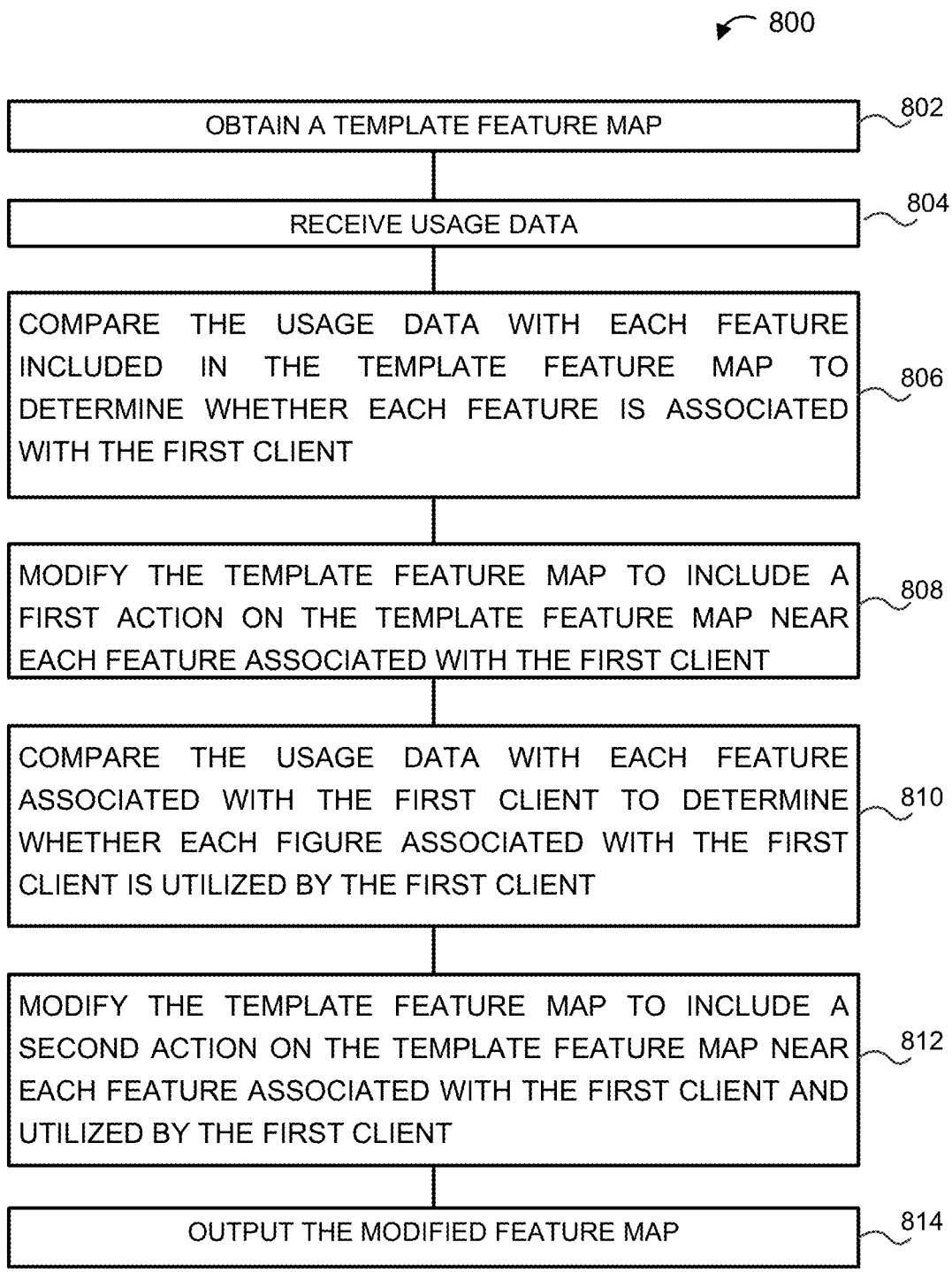
FIG. 8 illustrates a block diagram of a method to generate a client-specific feature map, in accordance with various embodiments.

FIG. 8 illustrates a block diagram of a method to generate a client-specific feature map, in accordance with various embodiments. The method may include obtaining a template feature map (block 802). The template feature map may include a visual representation of all features/application that can be provided by an operator. Each portion of the template feature map may be associated with a specific application. In some embodiments, each feature of the template feature map is associated with a portion of the template map, and wherein each portion is associated with a corresponding part of the usage data.

The method may include receiving a series of usage data associated with a first client (block 804). The usage data may include data resulting from executing applications associated with a first client.

In some embodiments, the usage data includes a listing of data resulting from processing instructions associated with the functions, the usage data represented in a listing of data separated by each function.

In some embodiments, usage data associated with each function is included in a row of the listing of data. In some embodiments, the usage data is received at an operator device from a network-accessible server system configured to process instructions relating to each function and generate the usage data.

The method may include comparing the usage data with each feature included in the template feature map to determine whether each feature is associated with the first client (block 806). In some embodiments, comparing the usage data with each feature included in the template feature map to determine whether each feature is associated with the first client includes determining whether the usage data includes any entries associated with a first feature, wherein the first feature is included as one of the features associated with the first client based on determining that usage data includes at least one entry associated with the first feature.

The method may include, for each feature associated with the first client, modifying the template feature map to include a first action on the template feature map near each feature associated with the first client (block 808). In some embodiments, modifying the template feature map to include the first action includes any of removing all features not associated with the first client or adding a first mark near each feature associated with the first client, the first mark indicative that each marked feature is available to the first client.

The method may include comparing the usage data with each feature associated with the first client to determine whether each figure associated with the first client is utilized by the first client (block 810). In some embodiments, comparing the usage data with each feature included in the template feature map to determine whether each feature associated with the first client and utilized by the first client includes determining whether the usage data includes any non-zero entries associated with a first feature, wherein the first feature is included as one of the features associated with the first client and utilized by the first client based on determining that the usage data includes at least one non-zero entry associated with the first feature.

The method may include, for each feature associated with the first client and utilized by the first client, modifying the template feature map to include a second action on the template feature map near each feature associated with the first client and utilized by the first client (block 812). In some embodiments, modifying the template feature map to include the second action includes at least one of adding a second mark to each feature associated with the first client and utilized by the first client, the second mark indicating that each feature is utilized by the first client, and adding a third mark to each feature associated with the first client and not utilized by the first client, the third mark indicating that each feature is not utilized by the first client.

The method may include sending the modified template feature map (block 814). The modified template feature map includes the template feature map modified to add the first and second action to the template feature map.

In some embodiments, the method includes sending a request to a third-party application server requesting third-party usage data associated with the first client, determining whether any of the third-party usage data is associated with a third party feature included in the template feature map, and responsive to determining that any of the third party usage data is associated with the third party feature, modifying the template feature map to include the first action on the template feature map near the third party feature.

Example Processing System

Figure 9:
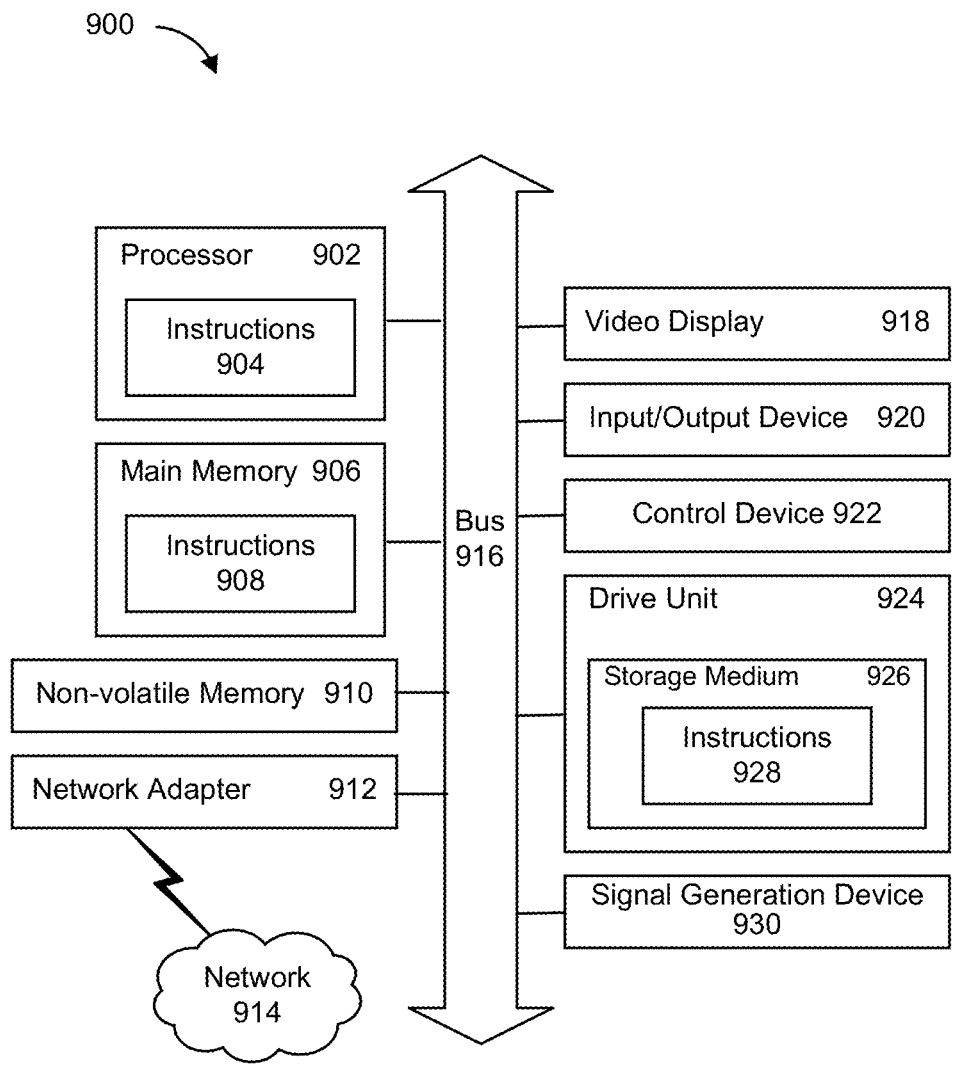
FIG. 9 is a block diagram that illustrates an example of a processing system in which at least some operations described herein can be implemented.

FIG. 9 is a block diagram illustrating an example of a processing system 900 in which at least some operations described herein can be implemented. As shown in FIG. 9, the processing system 900 may include one or more central processing units ("processors") 902, main memory 906, non-volatile memory 910, network adapter 912 (e.g., network interfaces), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 900 operates as part of a user device, although the processing system 900 may also be connected (e.g., wired or wirelessly) to the user device. In a networked deployment, the processing system 900 may operate in the capacity of a server or a client machine in a client-server network environment, or as a peer machine in a peer-to-peer (or distributed) network environment.

The processing system 900 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 900.

While the main memory 906, non-volatile memory 910, and storage medium 926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 904, 908, 928) set at various times in various memory and storage devices in a computer, and that, when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 910, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 912 enables the processing system 900 to mediate data in a network 914 with an entity that is external to the processing system 900 through any known and/or convenient communications protocol supported by the processing system 900 and the external entity. The network adapter 912 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:
1. A method comprising:
obtaining a template feature map representing a visual representation of a plurality of features provided by an operator;

receiving a series of usage data associated with a first client;

comparing the usage data with each feature included in the template feature map to determine whether each feature is associated with the first client and to determine whether the usage data includes any non-zero entries associated with a first feature, wherein the first feature is included as one of the features associated with the first client and utilized by the first client based on determining that the usage data includes at least one non-zero entry associated with the first feature;

for each feature associated with the first client, modifying the template feature map to include a first action on the template feature map near each feature associated with the first client;

comparing the usage data with each feature associated with the first client to determine whether each figure associated with the first client is utilized by the first client;

for each feature associated with the first client and utilized by the first client, modifying the template feature map to include a second action on the template feature map near each feature associated with the first client and utilized by the first client; and sending the modified template feature map.

2. The method of claim 1, wherein the usage data includes a listing of data resulting from processing instructions associated with the functions, the usage data represented in a listing of data separated by each function.

3. The method of claim 2, wherein usage data associated with each function is included in a row of the listing of data.

4. The method of claim 1, wherein the usage data is received at an operator device from a network-accessible server system configured to process instructions relating to each function and generate the usage data.

5. The method of claim 1, wherein each feature is associated with a portion of the template map and wherein each portion is associated with a corresponding part of the usage data.

6. The method of claim 1, wherein comparing the usage data with each feature included in the template feature map to determine whether each feature is associated with the first client includes determining whether the usage data includes any entries associated with a first feature, wherein the first feature is included as one of the features associated with the first client based on determining that usage data includes at least one entry associated with the first feature.

7. The method of claim 1, wherein modifying the template feature map to include the first action includes any of removing all features not associated with the first client or adding a first mark near each feature associated with the first client, the first mark indicative that each marked feature is available to the first client.

8. The method of claim 1, wherein modifying the template feature map to include the second action includes at least one of:

adding a second mark to each feature associated with the first client and utilized by the first client, the second mark indicating that each feature is utilized by the first client; and adding a third mark to each feature associated with the first client and not utilized by the first client, the third mark indicating that each feature is not utilized by the first client.

9. A system to generate a modified feature map specific to a client, the system comprising:

a network-accessible server system configured to:

process a plurality of instructions associated with the client, the plurality of instructions associated with features available to the client;

generate usage data representing data resulting from processing the plurality of instructions associated with the client; and an operator device configured to:

obtain a template feature map representing a visual representation of all features provided by an operator;

receive the usage data associated with the client;

for each feature provided by the operator, determine whether the usage data includes any information relating to the feature;

upon determining that the usage data includes any information relating to any feature, modifying the template feature map to include a first marking on the template feature map near each feature indicative that each feature is available to the client;

for all features available to the client, determine whether the usage data includes any non-zero entries relating to each feature;

upon determining that the usage data includes any non-zero entries relating to each feature, modifying the template feature map to include a second marking on the template feature map near each feature indicative that each feature is utilized by the client, the modified feature map specific to the client including the modified template feature map.

10. The system of claim 9, wherein the operator device is further configured to:

inspect the usage data to identify a first portion of the usage data associated with a first feature, wherein the first portion of the usage data corresponds to a first area on the template feature map associated with the first feature.

11. The system of claim 9, wherein the first marking includes a mark near each feature on the template feature map, the first mark indicative that each marked feature is available to the first client.

12. The system of claim 9, wherein the operator device is further configured to:

add a third mark to each feature associated with the first client and not utilized by the first client, the third mark indicating that each feature is available to the client but not utilized by the client.

13. The system of claim 9, wherein the operator device is further configured to:

sending a request to a third-party application server requesting third-party usage data associated with the first client;

determining whether any of the third-party usage data is associated with a third party feature included in the template feature map; and responsive to determining that any of the third party usage data is associated with the third party feature, modifying the template feature map to include the first action on the template feature map near the third party feature.

14. A computer-implemented method to generate a modified feature map specific to a client, the method comprising:

receiving a request to generate the modified feature map specific to the client;

obtaining a template feature map representing a visual representation of a plurality of features provided by an operator, each feature associated with a plurality of instructions to be processed for the client;

obtaining usage data associated with the client;

comparing the usage data with each feature included in the template feature map to determine whether any feature is associated with the client and to determine whether the usage data includes any non-zero entries associated with a first feature, wherein the first feature is included as one of the features associated with the first client and utilized by the first client based on determining that the usage data includes at least one non-zero entry associated with the first feature;

upon determining that any feature is associated with the client, performing a first action to the template feature map near each feature;

comparing the usage data with each feature associated with the client to determine whether any figure is utilized by the client;

for each feature associated with the first client and utilized by the first client, performing a second action to the template feature map near each feature associated with the first client and utilized by the first client; and generating the modified feature map specific to the client that includes the modified template feature map.

15. The computer-implemented method of claim 14, wherein the usage data includes a listing of data resulting from processing instructions associated with each function, the usage data represented in a listing of data separated by each function where each row of the usage data is associated with a corresponding function.

16. The computer-implemented method of claim 14, wherein comparing the usage data with each feature included in the template feature map to determine whether each feature is associated with the first client includes determining whether the usage data includes any entries associated with a first feature, wherein the first feature is included as one of the features associated with the first client based on determining that usage data includes at least one entry associated with the first feature.

* * * * *